(12) United States Patent
Pignataro et al.

(10) Patent No.: US 10,574,563 B2
(45) Date of Patent: Feb. 25, 2020

(54) SEAMLESS BIDIRECTIONAL FORWARDING DETECTION DISCRIMINATOR BASED RETURN PATH DETERMINATION

(71) Applicant: Cisco Technology, Inc., San Jose, CA (US)

(72) Inventors: Carlos M. Pignataro, Cary, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 15/880,910

(22) Filed: Jan. 26, 2018

(65) Prior Publication Data

US 2019/0238448 A1 Aug. 1, 2019

(51) Int. Cl.
*H04L 12/721* (2013.01)
*H04L 12/26* (2006.01)

(52) U.S. Cl.
CPC .............. *H04L 45/12* (2013.01); *H04L 43/04* (2013.01)

(58) Field of Classification Search
CPC ................................ H04L 45/12; H04L 43/04
See application file for complete search history.

(56) References Cited

U.S. PATENT DOCUMENTS 9,497,107 B1 * 11/2016 Akiya ..................... H04L 45/22
2016/0036694 A1    2/2016 Abdul et al.
2016/0261474 A1 *  9/2016 Raghavan ............... H04L 43/10

OTHER PUBLICATIONS

Katz, et al., "Bidirectional Forwarding Detection (BFD)," Internet Engineering Task Force (IETF), Standards Track, Request for Comments: 5880, Jun. 2010, 49 pages.
Chen, et al., "Return Path Specified Label Switched Path (LSP) Ping," Internet Engineering Task Force (IETF), Standards Track, Request for Comments: 7110, Jan. 2014, 21 pages.
Pignataro, et al., "Seamless Bidirectional Forwarding Detection (S-BFD)," Internet Engineering Task Force (IETF), Request for Comments: 7880, Jul. 2016, 24 pages.
(Continued)

*Primary Examiner* — Kyaw Z Soe
(74) *Attorney, Agent, or Firm* — Edell, Shapiro & Finnan, LLC

(57) ABSTRACT

Seamless Bidirectional Forwarding Detection (S-BFD) discriminator-based return path determination is provided. In one embodiment, a method is provided that includes assigning a first discriminator associated with a first discriminator identifier and a second discriminator associated with a second discriminator identifier different from the first discriminator. The method also includes receiving an S-BFD control packet that includes one of the first discriminator identifier or the second discriminator identifier. The method includes determining whether the first discriminator identifier or the second discriminator identifier is included in the S-BFD control packet, and based on the determination, initiating an S-BFD reflector session to transmit a response along a return path determined based on whether the first discriminator identifier or the second discriminator identifier is included in the S-BFD control packet.

20 Claims, 8 Drawing Sheets

(56) References Cited

OTHER PUBLICATIONS

V. Govindan et al., "Advertising Seamless Bidirectional Forwarding Detection (S-BFD) Discriminators in the Layer Two Tunneling Protocol Version 3 (L2TPv3)", Request for Comments: 7886, Jul. 2016, 6 pages.
C. Pignataro et al., "OSPF Extensions to Advertise Seamless Bidirectional Forwarding Detection (S-BFD) Target Discriminators", Request for Comments: 7884, Jul. 2016, 7 pages.
L. Ginsberg et al., "Advertising Seamless Bidirectional Forwarding Detection (S-BFD) Discriminators in IS-IS", Request or Comments: 7883, Jul. 2016, 5 pages.
G. Mirsky et al., "Bidirectional Forwarding Detection (BFD) in Segment Routing Networks Using MPLS Dataplane", draft-mirsky-spring-bfd-03, Dec. 4, 2017, 10 pages.
G. Mirsky et al., "Bidirectional Forwarding Detection (BFD) Directed Return Path", draft-ietf-mpls-bfd-directed-08, Dec. 5, 2017, 8 pages.

\* cited by examiner

SEAMLESS BIDIRECTIONAL FORWARDING DETECTION DISCRIMINATOR BASED RETURN PATH DETERMINATION

TECHNICAL FIELD

The present disclosure relates to return path determination in a computer network.

BACKGROUND

Bidirectional Forwarding Detection (BFD) is an Internet Engineering Task Force (IETF) standard that allows two endpoints to monitor reachability over a link or a network by both ends periodically sending "hello" packets to each other. It is an efficient and generic hello/keepalive protocol that is widely used by many applications, including, for example, Interior Gateway Protocols (IGPs), Exterior Gateway Protocols (EGPs) and protocols such as Hot Standby Router Protocol (HSRP), Inter-Chassis Communication Protocol (ICCP), and others.

Seamless Bidirectional Forwarding Detection (S-BFD) is a simplified mechanism for using BFD with a large proportion of negotiation aspects eliminated for network continuity testing.

DESCRIPTION OF EXAMPLE EMBODIMENTS

Overview

Figure 1:
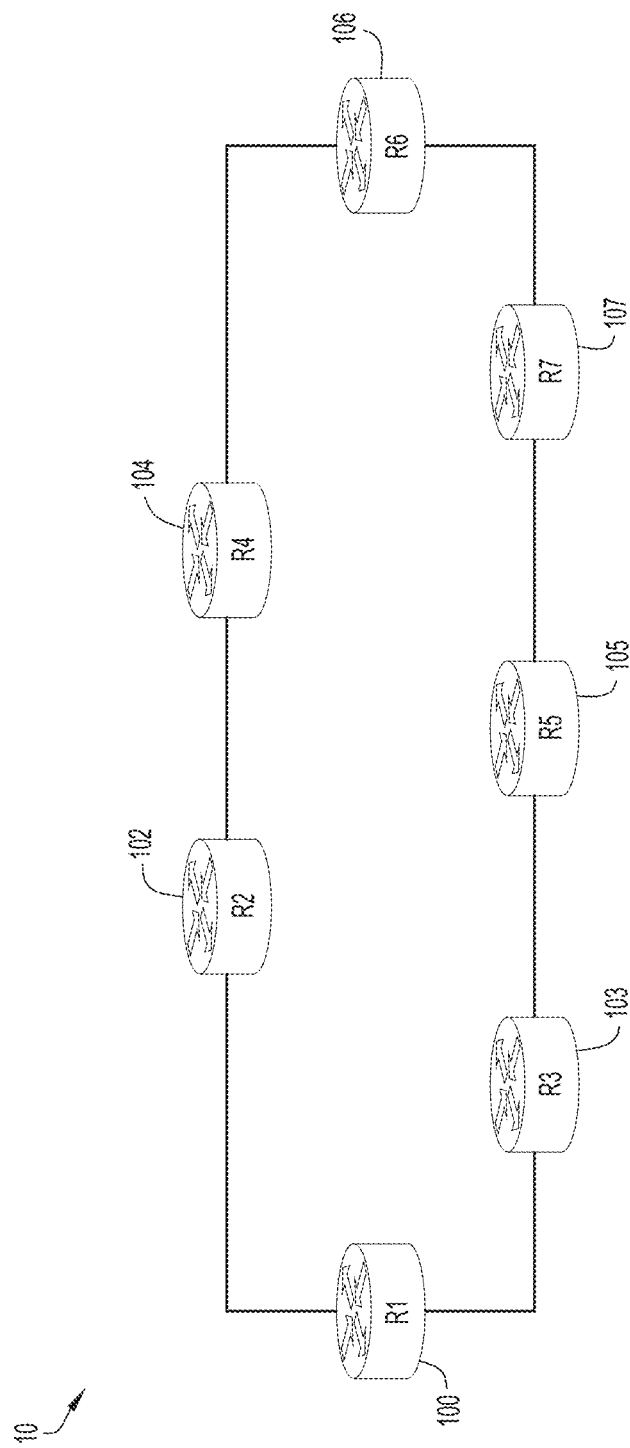
FIG. 1 is a diagram of a network in which Seamless Bidirectional Forwarding Detection discriminator-based return path determination may be implemented, according to an example embodiment.

Presented herein is an implementation of Seamless Bidirectional Forwarding Detection (S-BFD) discriminator-based return path determination. In an example embodiment, method is provided that includes assigning, at a first network element, a first discriminator associated with a first discriminator identifier. The method includes assigning, at the first network element, a second discriminator associated with a second discriminator identifier. The second discriminator is different from the first discriminator. The method also includes receiving, at the first network element, a seamless bidirectional forwarding detection (S-BFD) control packet sent from a second network element. The S-BFD control packet includes one of the first discriminator identifier or the second discriminator identifier. The method includes determining whether the first discriminator identifier or the second discriminator identifier is included in the S-BFD control packet. Based on the determination, the method includes initiating an S-BFD reflector session to transmit a response S-BFD control packet to the second network element along a return path determined based on whether the first discriminator identifier or the second discriminator identifier is included in the S-BFD control packet.

Example Embodiments

Bidirectional forwarding detection (BFD) is a commonly-used Continuity Check protocol for rapidly detecting any link down event in a network. Multi-hop BFD is used to validate paths and/or tunnels and take rapid action in the case of a failure. In many instances, a failure in a reverse path (from a responding node to an initiating node) results in the initiating node assuming that the corresponding forward path is also not working properly, thereby triggering path protection, such as Fast Reroute (FRR) functions.

One alternate mechanism proposed by IETF includes an initiating node sending a Label Switched Path (LSP) Ping with a return type length value (TLV) that instructs the return path information to the responding node. The responding node assigns a new discriminator for this session and if the control packet matches the new discriminator, it will impose the return TLV specified by the LSP Ping and forward the response over the return path instructed by the initiating node. However, this mechanism is stateful in nature, requiring a node to expend resources to monitor state entries. For example, in a medium-sized network with 5,000 edge nodes, a single subject edge node will have 10,000 state entries created to validate one tunnel from each remote edge node to the subject edge node. It is also very common to have multiple tunnels between edge nodes, which can drastically increase the number of state entries on the subject edge node.

According to the principles of the example embodiments, an S-BFD discriminator-based return path determination allows a return control packet to travel over different return paths as instructed by an initiating node with minimal BFD state entries at the initiating node.

Referring first to FIG. 1, a network 10 is shown in which an S-BFD discriminator-based return path determination may be implemented, according to an example embodiment. In this embodiment, network 10 may include a plurality of network elements (also referred to as "nodes"), including at least a first network element 100 (R1), a second network element 102 (R2), a third network element 103 (R3), a fourth network element 104 (R4), a fifth network element 105 (R5), a sixth network element 106 (R6), and a seventh network element 107 (R7). In an example embodiment, first network element 100 may be an initiating node and sixth network element 106 may be a responding node. In this embodiment, first network element 100 and sixth network element 106 can communicate with each other within network 10 over multiple paths that include one more of second network element 102, third network element 103, fourth network element 104, fifth network element 105, and/or seventh network element 107.

Network elements 100, 102, 103, 104, 105, 106, 107 may be any computer, server, router, switch, bridge, gateway, load-balancer, firewall, processor, network appliance, or any other suitable device, component, element, or object capable of sending, receiving, or forwarding information over a communication network, for example, network 10. In this embodiment, network 10 includes seven representative network elements 100, 102, 103, 104, 105, 106, 107, however, it should be understood that network 10 may include any number of network elements. For example, in some embodiments, network 10 may include hundreds, thousands, tens of thousands, or more, of network elements.

Figure 2:
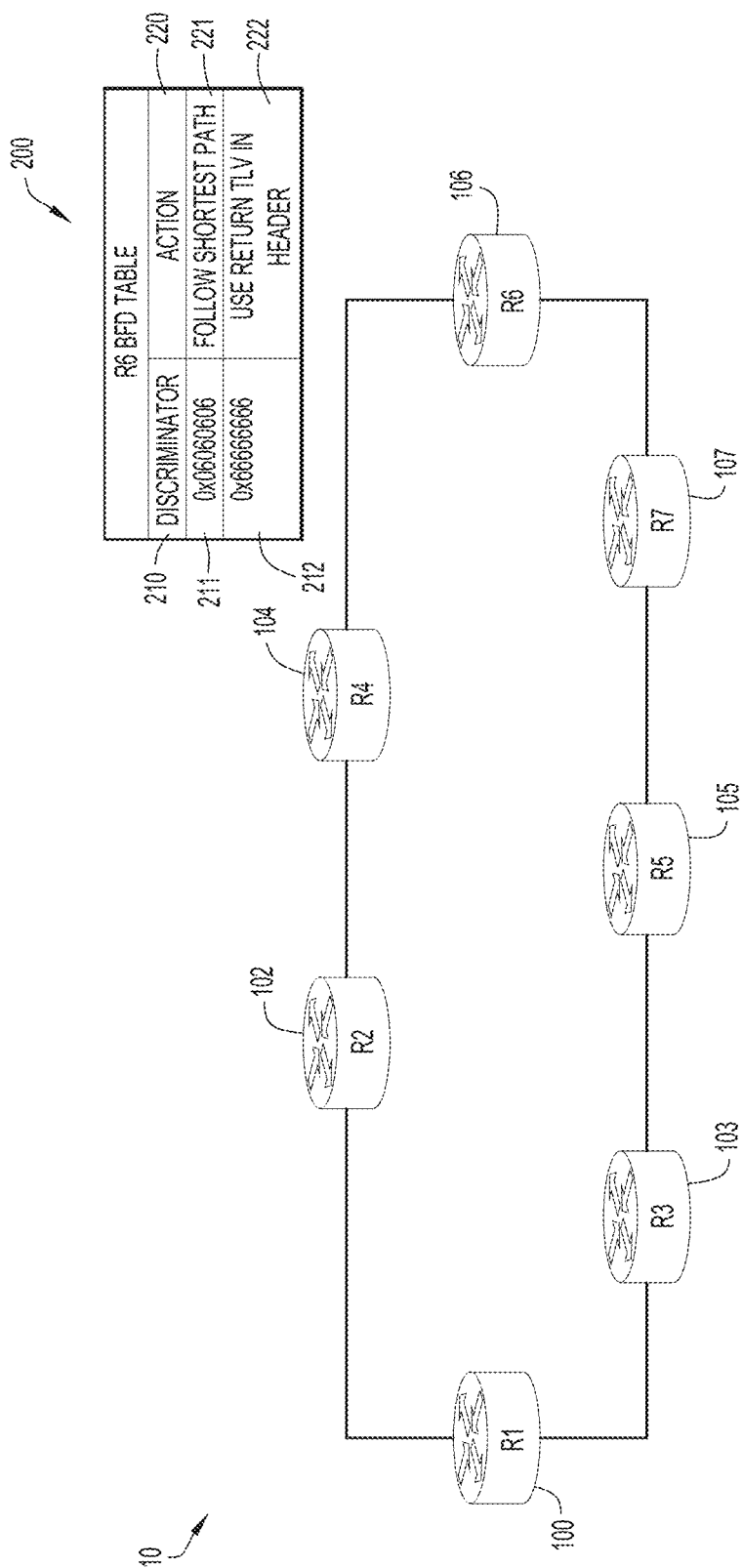
FIG. 2 is a diagram showing discriminator assignment at a network element for determining a return path for a packet through a network, according to an example embodiment.

Referring now to FIG. 2, assignment of discriminators at sixth network element 106 for determining a return path for a packet through network 10 is shown according to an example embodiment. In this embodiment, sixth network element 106 includes stored data associated with discriminator assignments. For example, sixth network element 106 may include an assignment table 200 stored in memory at sixth network element 106. The assignment table 200 includes assignment of two unique discriminator identifiers 211, 212 that are associated with discriminators configured to have different return path information.

In an example embodiment, assignment table 200 includes a discriminator column 210 and an associated action column 220 that maps each unique discriminator identifier to a discriminator having associated return path information for responding to a control packet. For example, discriminator column 210 includes a first discriminator identifier 211 (0x06060606) and a second discriminator identifier 212 (0x66666666) and action column 220 includes a first action 221 (follow shortest path) and a second action 222 (use Return TLV in header). According to the principles of the example embodiments described herein, first discriminator identifier 211 is mapped to a first discriminator configured to implement first action 221 so that a return control packet transmitted from sixth network element 106 uses return path information associated with the shortest return path from sixth network element 106 to the initiating node, for example, first network element 100. Second discriminator identifier 212 is mapped to a second discriminator configured to implement second action 222 so that a return control packet transmitted from sixth network element 106 uses return path information specified in a header of the received control packet, for example, a control packet sent from first network element 100.

Figure 3:
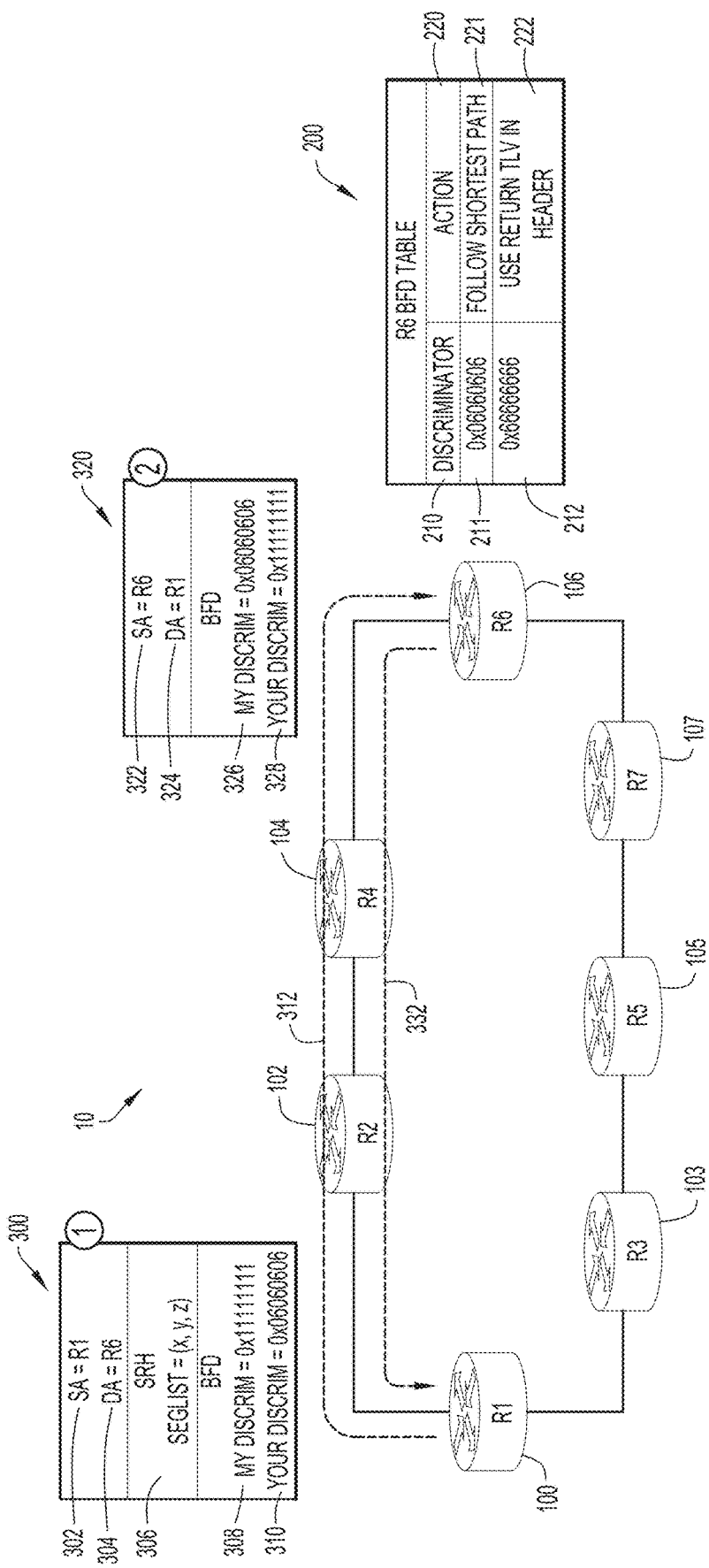
FIG. 3 is a diagram showing a first return path for a packet through a network based on a first discriminator assignment, according to an example embodiment.
Figure 4:
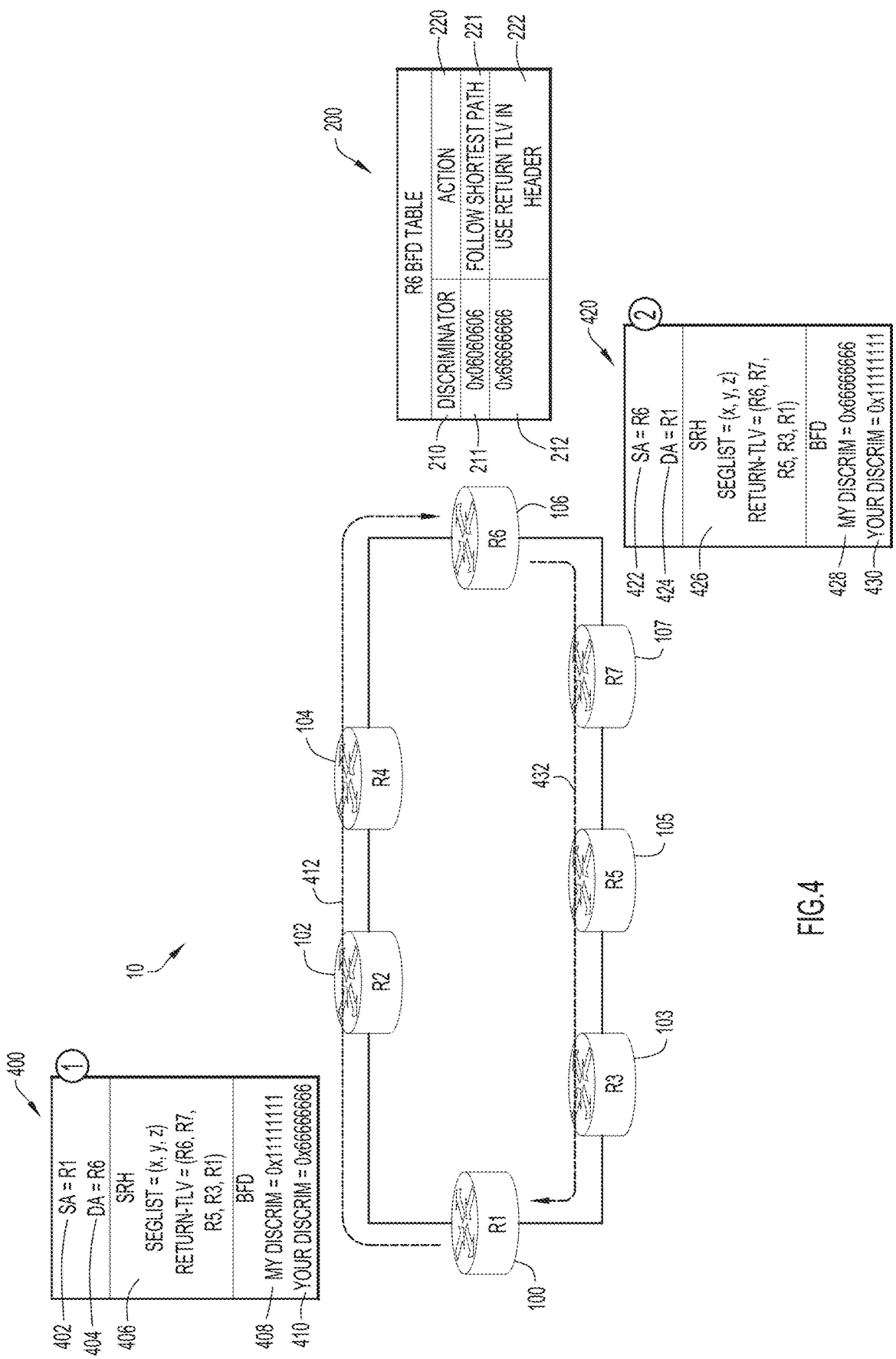
FIG. 4 is a diagram showing a second return path for a packet through a network based on a second discriminator assignment, according to an example embodiment.

Examples of return control packets transmitted from sixth network element 106 using the return path information associated with each of the unique discriminators assigned at sixth network element 106 are shown in FIGS. 3 and 4. Referring first to FIG. 3, a first return path for a packet through network 10 based on a first discriminator assignment is shown according to an example embodiment. In this embodiment, an initiating node, for example, first network element 100, generates a seamless bidirectional forwarding detection (S-BFD) control packet 300. Within a network, for example, network 10, a network element may send out one or more S-BFD control packets for the purposes of determining available paths through the network and checking the status of one or more of the network elements within the network.

S-BFD control packet 300 may be, for example, an IPv4 packet, an IPv6 packet, an Multiprotocol Label Switching (MPLS) packet, or any other suitable type of packet. In this example, S-BFD control packet 300 includes a source address 302 (SA=R1) identifying the source of S-BFD control packet 300 (e.g., first network element 100), as well as a destination address 304 (DA=R6) that identifies the destination of S-BFD control packet 300 (e.g., sixth network element 106). S-BFD control packet 300 also includes a Segment Routing Header (SRH) 306 that can include return path information that may be used for a return control packet by the responding node, e.g., sixth network element 106.

S-BFD control packet 300 also includes fields to identify appropriate S-BFD discriminators, including a My Discriminator (MD) identifier 308 (set to 0x11111111) and a Your Discriminator (YD) identifier 310 associated with a first discriminator identifier (set to 0x06060606). In this example, the first discriminator identifier 310 of S-BFD control packet 300 is associated with first discriminator identifier 211 of sixth network element 106. First discriminator identifier 211 is mapped to the first discriminator configured to implement first action 221 (e.g., follow shortest path) in assignment table 200 at sixth network element 106 so that a return control packet transmitted from sixth network element 106 uses return path information associated with the shortest return path from sixth network element 106 to first network element 100.

As shown in FIG. 3, S-BFD control packet 300 is transmitted through network 10 from first network element 100 to sixth network element 106 along a forward path 312. Forward path 312 includes first network element 100, second network element 102, fourth network element 104, and sixth network element 106. Once S-BFD control packet 300 is received by sixth network element 106, the YD identifier 310 is compared with stored data at sixth network element 106 associated with discriminator assignments. For example, by comparing the YD identifier 310 to the entries in discriminator column 210 of assignment table 200.

In this example, YD identifier 310 (set to 0x06060606) matches first discriminator identifier 211 associated with the first discriminator. Because first discriminator identifier 211 is included in S-BFD control packet 300, the first discriminator of sixth network element 106 may initiate an S-BFD reflector session to transmit a response S-BFD control packet 320 to first network element 100 along a first return path 332 determined based on first action 221 associated with first discriminator identifier 211. That is, first return path 332 for response S-BFD control packet 320 is determined based on the shortest path from sixth network element 106 to first network element 100. In some embodiments, the shortest path may be determined by sixth network element 106, for example, by using stored network topology information associated with network 10.

Response S-BFD control packet 320 includes a source address 322 (SA=R6) identifying the source of response S-BFD control packet 320 (e.g., sixth network element 106), as well as a destination address 324 (DA=R1) that identifies the destination of response S-BFD control packet 320 (e.g., first network element 100). Response S-BFD control packet 320 also includes fields to identify appropriate S-BFD discriminators, including a My Discriminator (MD) identifier 326 (set to 0x06060606), i.e., first discriminator identifier 211 associated with the first discriminator, and a Your Discriminator (YD) identifier 328 (set to 0x11111111), i.e., the MD identifier 308 from S-BFD control packet 300.

As shown in FIG. 3, response S-BFD control packet 320 is transmitted by the S-BFD reflector session of sixth network element 106 through network 10 from sixth network element 106 to first network element 100 along first return path 332. In this example, first return path 332 includes sixth network element 106, fourth network element 104, second network element 102, and first network element 100, which is the shortest path between sixth network element 106 and first network element 100 in network 10. In this embodiment, first return path 332 is the reverse order of forward path 312. In other embodiments, however, the shortest path determined as first return path 332 may not always be the reverse order of forward path 312.

FIG. 4 illustrates a second return path for a packet through network 10 based on a second discriminator assignment according to an example embodiment. In this embodiment, an initiating node, for example, first network element 100, generates an S-BFD control packet 400. In this example, S-BFD control packet 400 includes a source address 402 (SA=R1) identifying the source of S-BFD control packet 400 (e.g., first network element 100), as well as a destination address 404 (DA=R6) that identifies the destination of S-BFD control packet 400 (e.g., sixth network element 106).

S-BFD control packet 400 also includes a Segment Routing Header (SRH) 406 that includes return path information that may be used for a return control packet by the responding node, e.g., sixth network element 106. In an example embodiment, the return path information provided in SRH 406 may include an ordered set of a plurality of segment identifiers for one or more network elements of a plurality of network elements of network 10. In this embodiment, SRH 406 includes return path information (Return-TLV=R6, R7, R5, R3, R1) that specifies the return path for a response to S-BFD control packet 400. For example, as shown in FIG. 4, SRH 406 specifies a second return path 432 that includes sixth network element 106 (R6), seventh network element 107 (R7), fifth network element 105 (R5), third network element 103 (R3), and first network element 100 (R1).

S-BFD control packet 400 also includes fields to identify appropriate S-BFD discriminators, including a My Discriminator (MD) identifier 408 (set to 0x11111111) and a Your Discriminator (YD) identifier 410 associated with a second discriminator identifier (set to 0x66666666). In this example, the second discriminator identifier 410 of S-BFD control packet 400 is associated with second discriminator identifier 212 of sixth network element 106. Second discriminator identifier 212 is mapped to the second discriminator configured to implement second action 222 (e.g., use Return TLV in header) in assignment table 200 at sixth network element 106 so that a return control packet transmitted from sixth network element 106 uses return path information specified by first network element 100 in SRH 406 of S-BFD control packet 400 to return a response control packet to first network element 100.

As shown in FIG. 4, S-BFD control packet 400 is transmitted through network 10 from first network element 100 to sixth network element 106 along a forward path 412. Forward path 412 includes first network element 100, second network element 102, fourth network element 104, and sixth network element 106. Once S-BFD control packet 400 is received by sixth network element 106, the YD identifier 410 is compared with stored data at sixth network element 106 associated with discriminator assignments. For example, by comparing the YD identifier 410 to the entries in discriminator column 210 of assignment table 200.

In this example, YD identifier 410 (set to 0x66666666) matches second discriminator identifier 212 associated with the second discriminator. Because second discriminator identifier 212 is included in S-BFD control packet 400, the second discriminator of sixth network element 106 may initiate an S-BFD reflector session to transmit a response S-BFD control packet 420 to first network element 100 along second return path 432 determined based on second action 222 associated with second discriminator identifier 212. That is, second return path 432 for response S-BFD control packet 420 is determined based on the return path information specified by first network element 100, e.g., the segment list specified in SRH 406 (Return-TLV=R6, R7, R5, R3, R1) of S-BFD control packet 400. With this arrangement, second return path 432 through network 10 may be different than forward path 412.

Response S-BFD control packet 420 includes a source address 422 (SA=R6) identifying the source of response S-BFD control packet 420 (e.g., sixth network element 106), as well as a destination address 424 (DA=R1) that identifies the destination of response S-BFD control packet 420 (e.g., first network element 100). In this embodiment, response S-BFD control packet 420 also includes an SRH 426 that includes return path information specified by first network element 100 in S-BFD control packet 400 (e.g., Return-TLV=R6, R7, R5, R3, R1). Response S-BFD control packet 420 also includes fields to identify appropriate S-BFD discriminators, including a My Discriminator (MD) identifier 428 (set to 0x66666666), i.e., second discriminator identifier 212 associated with the second discriminator, and a Your Discriminator (YD) identifier 430 (set to 0x11111111), i.e., the MD identifier 408 from S-BFD control packet 400.

As shown in FIG. 4, response S-BFD control packet 420 is transmitted by the S-BFD reflector session of sixth network element 106 through network 10 from sixth network element 106 to first network element 100 along second return path 432. In this example, second return path 432 includes sixth network element 106, seventh network element 107, fifth network element 105, third network element 103, and first network element 100, which is the return path information between sixth network element 106 and first network element 100 specified by first network element 100 in S-BFD control packet 400 (e.g., in SRH 406). In this embodiment, second return path 432 is different than forward path 412. In some embodiments, first network element 100 may determine the return path information based on network topology information received from one or more network elements in network 10 and/or stored network topology information.

In summary, FIGS. 3 and 4 illustrate examples of S-BFD discriminator-based return path determination according to the principles of the embodiments described herein. With this arrangement, response control packets may be transmitted back to the initiating node over a shortest return path (e.g., first return path 332 as shown in FIG. 3) or a specified return path (e.g., second return path 432 as shown in FIG. 4) based on the inclusion of a first discriminator identifier (e.g., first discriminator identifier 211) or a second discriminator identifier (e.g., second discriminator identifier 212).

Figure 5:
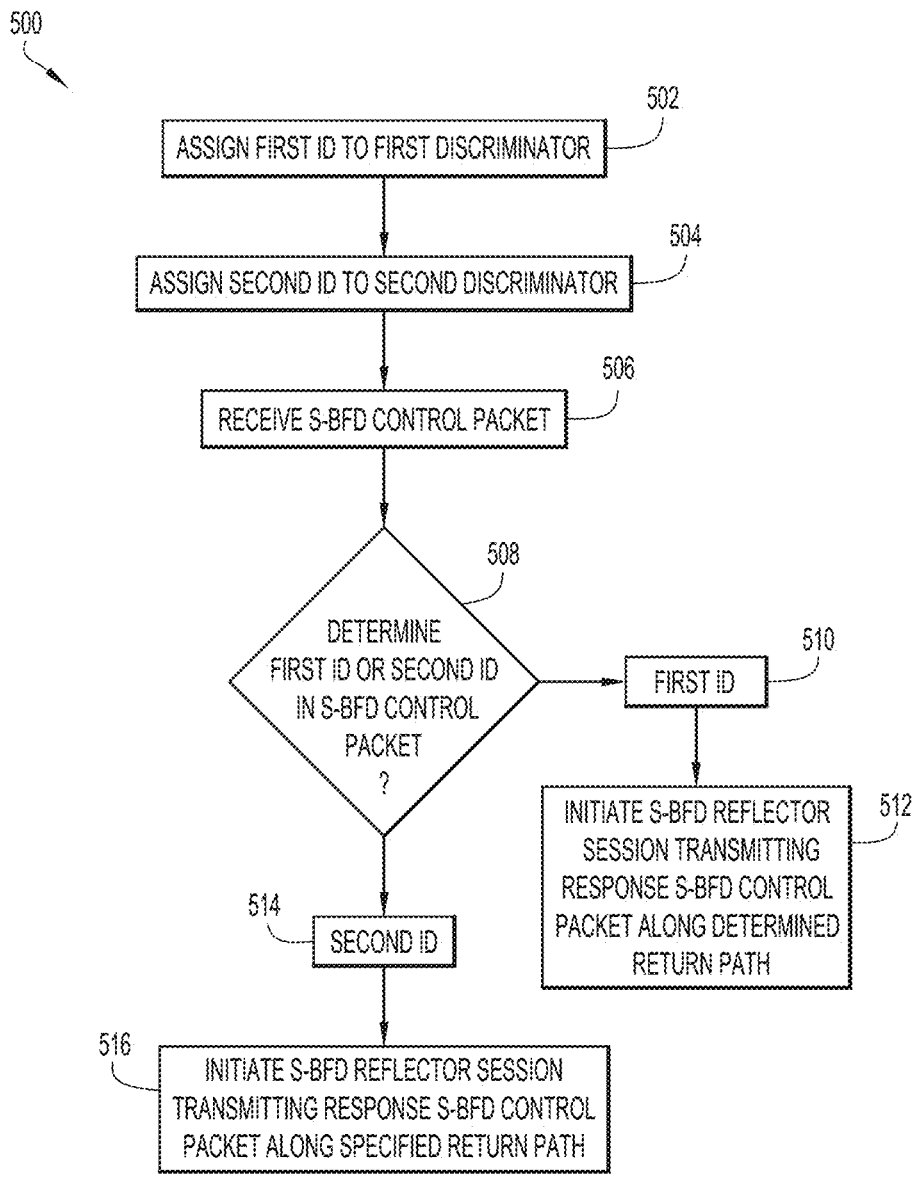
FIG. 5 is a flowchart of a method for a discriminator-based return path determination, according to an example embodiment.

FIG. 5 illustrates a flowchart of a method 500 for a discriminator-based return path determination at a responding node, according to an example embodiment. Reference is also made to FIGS. 1-4 for purposes of the description of FIG. 5. In this embodiment, method 500 may begin at an operation 502, where a first discriminator identifier (ID) is assigned to a first discriminator. For example, sixth network element 106 assigns first discriminator identifier 211 to the first discriminator, as described above. Next, at an operation 504, a second discriminator identifier (ID) is assigned to a second discriminator. For example, sixth network element 106 assigns second discriminator identifier 212 to the second discriminator, as described above. Each of the first discriminator and second discriminator are associated with unique IDs and are different from each other.

Additionally, according to the principles of the example embodiments described herein, each discriminator is mapped to a different action for return path determination. For example, as mapped in assignment table 200 at sixth network element 106, first discriminator identifier 211 is mapped to the first discriminator configured to implement first action 221 so that a return control packet uses return path information associated with the shortest return path. Whereas, second discriminator identifier 212 is mapped to the second discriminator configured to implement second action 222 so that a return control packet uses return path information specified in a header of the received control packet. With this arrangement, a return path determination may be made on the basis of the discriminator identifier included in a received control packet.

At an operation 506, an S-BFD control packet sent by an initiating node is received at a responding node. For example, S-BFD control packet 300 sent by first network element 100 and received at sixth network element 106, as described with reference to FIG. 3 above. Next, at an operation 508, the responding node determines whether the S-BFD control packet includes the first discriminator ID or the second discriminator ID. For example, the YD identifier 310 from S-BFD control packet 300 may be compared with stored data at sixth network element 106 associated with discriminator assignments, such as the entries in discriminator column 210 of assignment table 200.

If, at an operation 510, the S-BFD control packet includes the first discriminator ID, the method 500 may proceed to an operation 512 where an S-BFD reflector session may be initiated at the responding node for transmitting a response S-BFD control packet along a return path based on the mapped action for the first discriminator ID. For example, as shown in FIG. 3 above, when the YD identifier 310 from S-BFD control packet 300 matches first discriminator identifier 211, which is mapped to first action 221, an S-BFD reflector session initiated by sixth network element 106 transmits a response S-BFD control packet along a shortest path back to first network element 100 (e.g., along first return path 332). In this example, the responding node (e.g., sixth network element 106) may determine the shortest path to use for the return path to the initiating node. In some cases, the shortest path may be determined based on network topology information available in stored data at the responding node.

If, at an operation 514, the S-BFD control packet includes the second discriminator ID, the method 500 may proceed to an operation 516 where an S-BFD reflector session may be initiated at the responding node for transmitting a response S-BFD control packet along a return path based on the mapped action for the second discriminator ID. For example, as shown in FIG. 4 above, when the YD identifier 410 from S-BFD control packet 400 matches second discriminator identifier 212, which is mapped to second action 222, an S-BFD reflector session initiated by sixth network element 106 transmits a response S-BFD control packet back to first network element 100 along a specified return path that was included in SRH 406 of S-BFD control packet 400 (e.g., along second return path 432). In this example, the return path information provided in SRH 406 may include an ordered set of a plurality of segment identifiers for one or more network elements of a plurality of network elements of network 10 (e.g., Return-TLV=R6, R7, R5, R3, R1 as shown in FIG. 4).

Additionally, method 500 may continue by returning to operation 506 and proceeding to compare the YD discriminator identifiers in the received S-BFD control packets to one of the first discriminator ID or the second discriminator ID for each S-BFD control packet received. For example, in some embodiments, a network element may receive a plurality of S-BFD control packets. As a result, once a first discriminator ID and a second discriminator ID are assigned at operations 502, 504, method 500 for discriminator-based return path determination may be implemented by determining whether the first discriminator ID or the second discriminator ID are included in an S-BFD control packet and transmitting a response S-BFD control packet along the return path associated with the identified discriminator ID.

Figure 6:
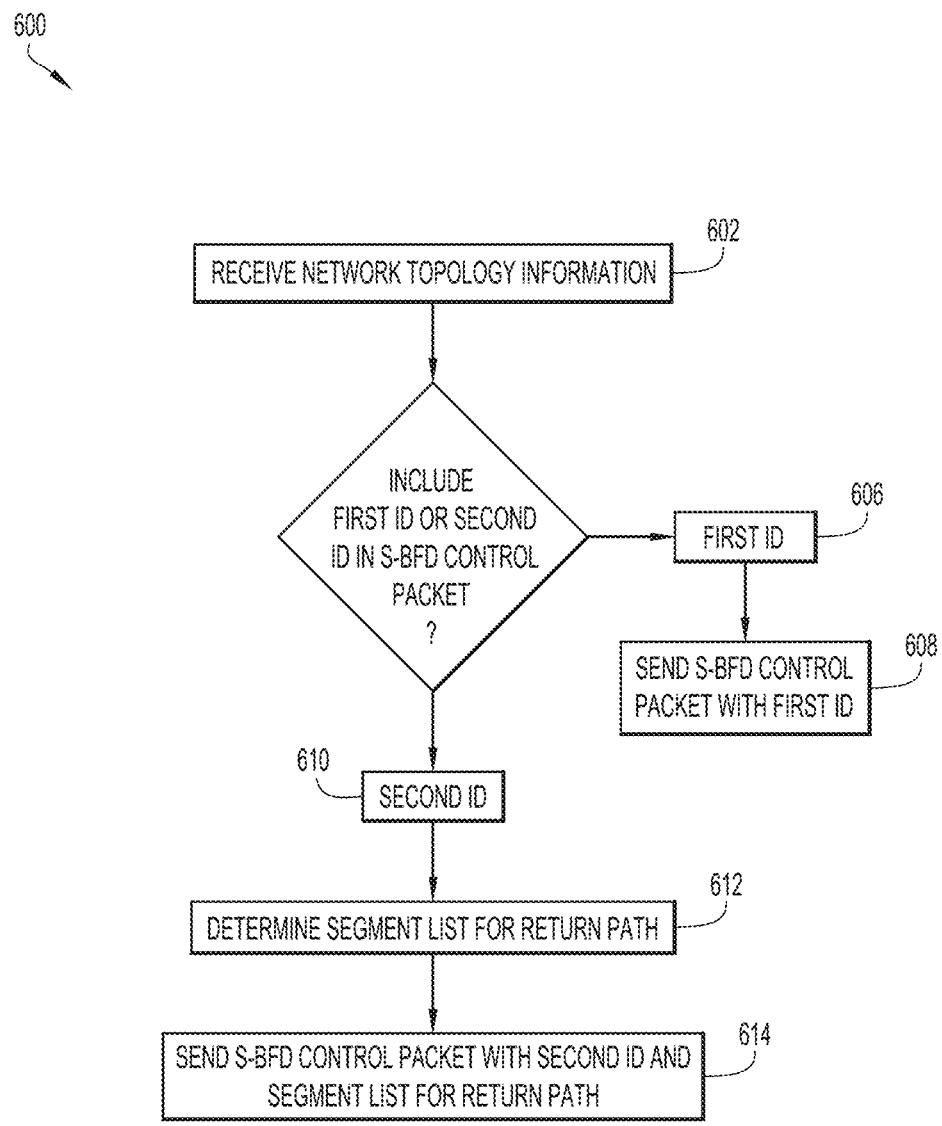
FIG. 6 is a flowchart of a method of sending a control packet with return path information from a network element, according to an example embodiment.

FIG. 6 illustrates a flowchart of a method 600 for discriminator-based return path determination at an initiating node, according to an example embodiment. In this embodiment, method 600 may begin at an operation 602, where an initiating node (e.g., first network element 100) receives network topology information from one or more network elements of a plurality of network elements in network 10. For example, as shown in FIG. 1, network 10 can include plurality of network elements 100, 102, 103, 104, 105, 106, 107. Network topology information may be received from any one or more of network elements 100, 102, 103, 104, 105, 106, 107 and may be stored at first network element 100 for determining return path information.

Next, at an operation 604, the initiating node (e.g., first network element 100) may use the network topology information received at operation 602 and/or network topology information stored at the node to determine whether to include the first discriminator ID or the second discriminator ID in an S-BFD control packet. As described above, each discriminator ID is mapped to a specific action at a responding node (e.g., sixth network element 106) for return path determination. Accordingly, by including one of the first discriminator ID or the second discriminator ID in an S-BFD control packet, the initiating node may determine the appropriate return path for a response S-BFD control packet. In other words, a discriminator-based return path determination according to the present embodiments can be set by the initiating node by the inclusion of the appropriate discriminator ID in the S-BFD control packet.

If, at operation 604, the initiating node determines that a shortest return path is appropriate, then method 600 may proceed to an operation 606, where the first discriminator ID is selected and at an operation 608, an S-BFD control packet including the first discriminator ID is sent to a responding node.

If, at operation 604, the initiating node determines that a specified return path is appropriate, then method 600 may proceed to an operation 610, where the second discriminator ID is selected. Next, at an operation 612, the initiating node may determine a segment list for the return path through the network. For example, at operation 612, first network element 100 may determine an ordered set of a plurality of segment identifiers for one or more network elements of a plurality of network elements of network 10 (e.g., Return-TLV=R6, R7, R5, R3, R1 as shown in FIG. 4) to include in SRH 406 of S-BFD control packet 400. In some cases, the segment list for the return path (e.g., ordered set of segment identifiers) may be based on the received network topology information and/or stored network topology information. Next, at an operation 614, an S-BFD control packet including the second discriminator ID and the segment list for the return path is sent to a responding node. With this arrangement, a properly functioning and/or more efficient return path can be specified by the initiating node.

Additionally, method 600 may continue for a plurality of S-BFD control packets. In some embodiments, different return paths may be determined at operation 612 for different S-BFD control packets. For example, consider a first S-BFD control packet that includes the second discriminator ID and has a first segment list determined at operation 612 for specifying a first return path for a response S-BFD control packet. In this case, the first segment list may include a first ordered set of segment identifiers of a plurality of network elements in network 10 that is included in an SRH of the first S-BFD control packet. A second S-BFD control packet may also include the second discriminator ID. In this example, however, the second S-BFD control packet may include a second segment list determined at operation 612 that is different than the first segment list determined for the first S-BFD control packet. The second segment list can specify a second return path for a response S-BFD control packet that is different than the first specified return path. In this case, the second segment list may include a second ordered set of segment identifiers of a plurality of network elements in network 10 that is included in an SRH of the second S-BFD control packet.

Additionally, at least one segment identifier in the first ordered set of segment identifiers is different from the segment identifiers in this second ordered set of segment identifiers. In some cases, each ordered set may include some segment identifiers in common with each other, but at least one segment identifier will be different. With this arrangement, the specified return paths associated with the first ordered set and the second ordered set are also different. As a result, an initiating node may make changes to the specified return path information, for example, based on updated or changed network topology information.

The previous embodiments have been described in reference to packets implementing Segment Routing (SRv6) techniques. In other embodiments, the principles of the example embodiments described herein also may be applied to packets including Network Service Headers (NSH) or other overlay technologies. In such embodiments, a packet sent to a responding node (e.g., sixth network element 106) may include information regarding a service function path identifier (SFP-ID) and service index (SI) and metadata that includes return path information. For example, the return path information in the metadata of the NSH packet may be a return label stack or internet protocol (IP) stack that identifies a specific return path through the network (e.g., network 10) for a response.

As with the previous embodiments, the NSH packet also includes a YD identifier that includes either the first discriminator ID or the second discriminator ID assigned to the responding node (e.g., first discriminator identifier 211 or second discriminator identifier 212 for sixth network element 106). Depending on the discriminator included in the NSH packet, the return path determination is made either according to the shortest path or using the return path information specified in the packet (e.g., the return path information in the metadata of the NSH packet), as described in the example embodiments.

Additionally, the SFP-ID and SI included in the header of the NSH packet may be set to values that instructs the responding node that there is no associated service layer application that is required to treat the packet. For example, setting the SFP-ID and SI to zero or to the reserved range for S-BFD may indicate to the responding node that no service layer application is required. Upon receiving an NSH packet with SFP-ID and SI set to these values, the responding node will not apply a service application, and, instead, decapsulates the packet and uses the return path information in the metadata to determine the return path for a response packet.

Similar modifications may be made to other overlay technologies to implement the principles of discriminator-based return path determination described herein, including, for example, Virtual eXtensible Local Area Network (VX-LAN), Generic Protocol Extension for VXLAN (VXLAN-GPE), and other overlay technologies, which may make use of VXLAN Network Identifier (VNI) fields to implement the discriminator-based return path determination according to the exemplary embodiments.

Figure 7:
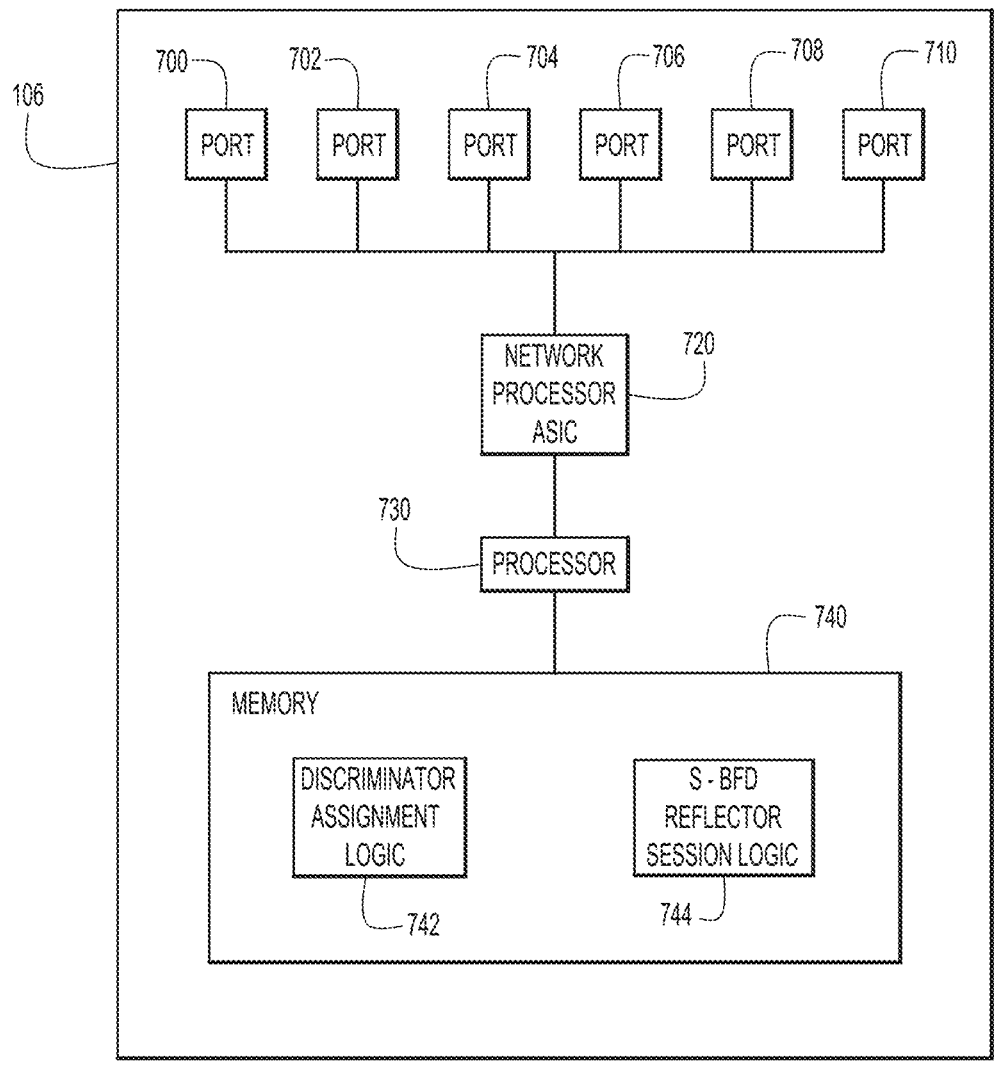
FIG. 7 is a block diagram of a network element configured to implement a discriminator-based return path determination, according to an example embodiment.

Referring now to FIG. 7, a block diagram is shown of a network element/responding node that is configured to implement a discriminator-based return path determination, for example, sixth network element 106. In this embodiment, sixth network element 106 may include a plurality of network ports 700, 702, 704, 706, 708, 710, a Network Processor Application Integrated Circuit (ASIC) 720, a processor 730 for processing information and may further include a bus (not shown) or other communication mechanism coupled with processor 730 for communicating the information. The Network Processor ASIC 720 performs any of a variety of networking functions (routing, switching, network address translation, etc.). Network Processor ASIC 720 may also be referred to herein as a network processor unit that performs one or more networking functions for packets received at the network ports 700, 702, 704, 706, 708, 710 and to be sent from the ports. Network Processor ASIC 720, may, for example, include one or more linecards configured to enable network communications and permit the plurality of network ports 700, 702, 704, 706, 708, 710 to receive inbound packets and to send outbound packets. While the figure shows a single block 730 for a processor, it should be understood that the processor 730 may represent a plurality of processing cores, each of which can perform separate processing.

Sixth network element 106 may also include a memory 740. The memory 740 may be read only memory (ROM), random access memory (RAM), magnetic disk storage media devices, optical storage media devices, flash memory devices, electrical, optical, or other physical/tangible memory storage devices. Thus, in general, the memory 740 may comprise one or more tangible (non-transitory) computer readable storage media (e.g., a memory device) encoded with software comprising computer executable instructions and when the software is executed (by the processor 730) it is operable to perform the operations described herein. For example, one or more of discriminator assignment control logic 742 and S-BFD reflector session control logic 744 is stored in memory 740 for providing one or more of the functions of sixth network element 106 described herein. In particular, discriminator assignment control logic 742 may cause sixth network element 106 to perform the discriminator assignment and associated action operations described above in connection with FIGS. 2-5 above when executed by processor 730 from memory 740. Similarly, S-BFD reflector session control logic 744 may cause sixth network element 106 to perform the S-BFD reflection session operations described above in connection with operations 512, 516 of method 500 shown in FIG. 5 above when executed by processor 730 from memory 740.

In addition, memory 740 may be used for storing temporary variables or other intermediate information during the execution of instructions by processor 730. Additionally, in some embodiments, one or more functions of sixth network element 106, discriminator assignment control logic 742, and S-BFD reflector session control logic 744 may be performed by Network Processor ASIC 720.

Figure 8:
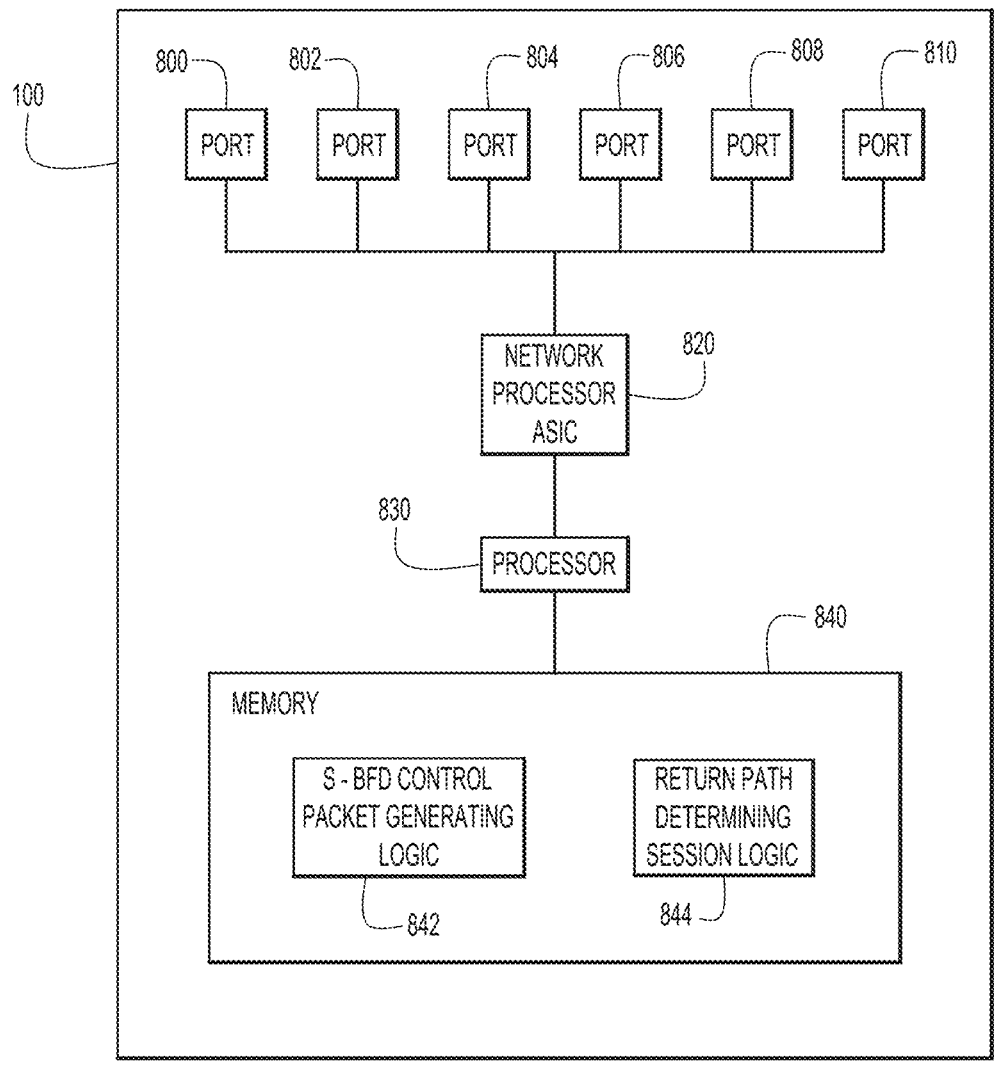
FIG. 8 is a block diagram of a network element configured to send a control packet with return path information, according to an example embodiment.

Referring now to FIG. 8, a block diagram is shown of a network element/initiating node that is configured to implement a discriminator-based return path determination by sending a control packet with return path information, for example, first network element 100. In this embodiment, first network element 100 may include a plurality of network ports 800, 802, 804, 806, 808, 810, a Network Processor ASIC 820, a processor 830 for processing information and may further include a bus (not shown) or other communication mechanism coupled with processor 730 for communicating the information. The Network Processor ASIC 820 performs any of a variety of networking functions (routing, switch, network address translation, etc.). Network Processor ASIC 820 may also be referred to herein as a network processor unit that performs one or more networking functions for packets received at the network ports 800, 802, 804, 806, 808, 810 and to be sent from the ports. Network Processor ASIC 820, may, for example, include one or more linecards configured to enable network communications and permit the plurality of network ports 800, 802, 804, 806, 808, 810 to receive inbound packets and to send outbound packets. While the figure shows a single block 830 for a processor, it should be understood that the processor 830 may represent a plurality of processing cores, each of which can perform separate processing.

First network element 100 may also include a memory 840. The memory 840 may be ROM, RAM, magnetic disk storage media devices, optical storage media devices, flash memory devices, electrical, optical, or other physical/tangible memory storage devices. Thus, in general, the memory 840 may comprise one or more tangible (non-transitory) computer readable storage media (e.g., a memory device) encoded with software comprising computer executable instructions and when the software is executed (by the processor 830) it is operable to perform the operations described herein. For example, one or more of S-BFD control packet generating control logic 842 and return path determining control logic 844 is stored in memory 840 for providing one or more of the functions of first network element 100 described herein. In particular, S-BFD control packet generating control logic 842 may cause first network element 100 to perform the S-BFD control packet generating and sending operations described above in connection with FIGS. 2-4 and 6 above when executed by processor 830 from memory 840. Similarly, return path determining control logic 844 may cause first network element 100 to perform the return path determining operations described above in connection with operations of method 600 shown in FIG. 6 above when executed by processor 830 from memory 840.

In addition, memory 840 may be used for storing temporary variables or other intermediate information during the execution of instructions by processor 830. Additionally, in some embodiments, one or more functions of first network element 100, S-BFD control packet generating control logic 842, and return path determining control logic 844 may be performed by Network Processor ASIC 820.

The example embodiments provide an S-BFD discriminator-based return path determination. Each node is assigned a first unique discriminator and a second unique discriminator. The semantic (action) associated with the first unique discriminator is to use a shortest return path. The semantic (action) associated with the second unique discriminator is to use a return path (e.g., Return TLV) in the received header of a control packet.

For example, in Segment Routing (SRv6) techniques, an Initiator (e.g., an initiating node) will determine the return path and include it in SRH and set a discriminator of a control packet to the second unique discriminator. A Responder (e.g., a responding node) will create a reflector session for the second unique discriminator with a semantic (action) of "use return path in header" (e.g., Return TLV) to respond. The Responder on receiving any control packet with the second unique discriminator included will change the source-destination as defined by S-BFD standards, include SRH with the segment list from the return path information (e.g., Return TLV) of the received control packet, and respond.

The principles of the embodiments described herein allow the response control packet to use different return paths as instructed by an Initiator (e.g., an initiating node) with minimal BFD state entries.

In summary, a method is provided comprising: assigning, at a first network element, a first discriminator associated with a first discriminator identifier; assigning, at the first network element, a second discriminator associated with a second discriminator identifier, wherein the second discriminator is different from the first discriminator; receiving, at the first network element, a seamless bidirectional forwarding detection (S-BFD) control packet sent from a second network element, the S-BFD control packet including one of the first discriminator identifier or the second discriminator identifier; determining whether the first discriminator identifier or the second discriminator identifier is included in the S-BFD control packet; and initiating an S-BFD reflector session to transmit a response S-BFD control packet to the second network element along a return path determined based on whether the first discriminator identifier or the second discriminator identifier is included in the S-BFD control packet.

In another form, one or more non-transitory computer readable storage media encoded with instructions that, when executed by a processor of a first network element, cause the processor to: assign, at the first network element, a first discriminator associated with a first discriminator identifier; assign, at the first network element, a second discriminator associated with a second discriminator identifier, wherein the second discriminator is different from the first discriminator; receive, at the first network element, a seamless bidirectional forwarding detection (S-BFD) control packet sent from a second network element, the S-BFD control packet including one of the first discriminator identifier or the second discriminator identifier; determine whether the first discriminator identifier or the second discriminator identifier is included in the S-BFD control packet; and initiate an S-BFD reflector session to transmit a response S-BFD control packet to the second network element along a return path determined based on whether the first discriminator identifier or the second discriminator identifier is included in the S-BFD control packet.

In addition, an apparatus is provided comprising: a plurality of network ports configured to receive inbound packets and to send outbound packets; a memory; a processor coupled to the memory and to the plurality of network ports, wherein the processor is configured to: assign a first discriminator associated with a first discriminator identifier; assign a second discriminator associated with a second discriminator identifier, wherein the second discriminator is different from the first discriminator; receive a seamless bidirectional forwarding detection (S-BFD) control packet sent from a network element, the S-BFD control packet including one of the first discriminator identifier or the second discriminator identifier; determine whether the first discriminator identifier or the second discriminator identifier is included in the S-BFD control packet; and initiate an S-BFD reflector session to transmit a response S-BFD control packet to the network element along a return path determined based on whether the first discriminator identifier or the second discriminator identifier is included in the S-BFD control packet.

Additionally, a method is provided comprising: determining, at a first network element of a network, whether to include a first discriminator identifier or a second discriminator identifier based at least on network topology information for the network in a seamless bidirectional forwarding detection (S-BFD) control packet, wherein a return path for a response S-BFD control packet from a second network element is determined based on whether the first discriminator identifier or the second discriminator identifier is included in the S-BFD control packet; and sending the S-BFD control packet to the second network element.

In another form, one or more non-transitory computer readable storage media encoded with instructions that, when executed by a processor of a first network element of a network, cause the processor to: determine, at the first network element, whether to include a first discriminator identifier or a second discriminator identifier based at least on network topology information for the network in a seamless bidirectional forwarding detection (S-BFD) control packet, wherein a return path for a response S-BFD control packet from a second network element is determined based on whether the first discriminator identifier or the second discriminator identifier is included in the S-BFD control packet; and send the S-BFD control packet to the second network element.

In addition, an apparatus is provided comprising: a plurality of network ports configured to receive inbound packets and to send outbound packets; a memory; a processor coupled to the memory and to the plurality of network ports, wherein the processor is configured to: determine whether to include a first discriminator identifier or a second discriminator identifier based at least on network topology information for a network in a seamless bidirectional forwarding detection (S-BFD) control packet, wherein a return path for a response S-BFD control packet from a network element is determined based on whether the first discriminator identifier or the second discriminator identifier is included in the S-BFD control packet; and send the S-BFD control packet to the network element.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    assigning, at a first network element, a first discriminator associated with a first discriminator identifier;
    assigning, at the first network element, a second discriminator associated with a second discriminator identifier, wherein the second discriminator is different from the first discriminator;
    receiving, at the first network element, a seamless bidirectional forwarding detection (S-BFD) control packet sent from a second network element, the S-BFD control packet including one of the first discriminator identifier or the second discriminator identifier;
    determining whether the first discriminator identifier or the second discriminator identifier is included in the S-BFD control packet;
    initiating an S-BFD reflector session to transmit a response S-BFD control packet to the second network element along a return path determined based on whether the first discriminator identifier or the second discriminator identifier is included in the S-BFD control packet;
    when the first discriminator identifier is included in the S-BFD control packet, determining the return path for the response S-BFD control packet by the first network element; and
    when the second discriminator identifier is included in the S-BFD control packet, determining the return path for the response S-BFD control packet specified by the second network element in the S-BFD control packet.

2. The method of claim 1, wherein the return path determined by the first network element is a shortest path to the second network element.

3. The method of claim 1, wherein the return path specified by the second network element comprises a segment list included in a segment routing header of the S-BFD control packet.

4. The method of claim 1, further comprising:
    receiving, at the first network element, a plurality of S-BFD control packets sent from the second network element;
    wherein a first S-BFD control packet includes the second discriminator identifier and a first segment list in a segment routing header of the first S-BFD control packet, the first segment list specifying a first return path for a response S-BFD control packet transmitted from the first network element to the second network element; and
    wherein a second S-BFD control packet includes the second discriminator identifier and a second segment list in a segment routing header of the second S-BFD control packet, the second segment list specifying a second return path for a response S-BFD control packet transmitted from the first network element to the second network element, wherein the second return path is different than the first return path.

5. The method of claim 1, wherein the first network element and the second network element are disposed in a network comprising a plurality of network elements; and
    wherein the second network element includes one of the first discriminator identifier or the second discriminator identifier in the S-BFD control packet based on network topology information received by the second network element from one or more of the plurality of network elements.

6. The method of claim 5, wherein the second network element determines information for specifying the return path included in the S-BFD control packet based on the received network topology information.

7. The method of claim 1, wherein the S-BFD control packet is one of:
    an internet protocol version 4 (IPv4) packet;
    an internet protocol version 6 (IPv6) packet; and
    a Multiprotocol Label Switching (MPLS) packet.

8. One or more non-transitory computer readable storage media encoded with instructions that, when executed by a processor of a first network element, cause the processor to:
    assign, at the first network element, a first discriminator associated with a first discriminator identifier;
    assign, at the first network element, a second discriminator associated with a second discriminator identifier, wherein the second discriminator is different from the first discriminator;
    receive, at the first network element, a seamless bidirectional forwarding detection (S-BFD) control packet sent from a second network element, the S-BFD control packet including one of the first discriminator identifier or the second discriminator identifier;

determine whether the first discriminator identifier or the second discriminator identifier is included in the S-BFD control packet;

initiate an S-BFD reflector session to transmit a response S-BFD control packet to the second network element along a return path determined based on whether the first discriminator identifier or the second discriminator identifier is included in the S-BFD control packet;

when the first discriminator identifier is included in the S-BFD control packet, determine the return path for the response S-BFD control packet by the first network element; and when the second discriminator identifier is included in the S-BFD control packet, determine the return path for the response S-BFD control packet specified by the second network element in the S-BFD control packet.

9. The one or more non-transitory computer readable storage media of claim 8, wherein the return path determined by the first network element is a shortest path to the second network element.

10. The one or more non-transitory computer readable storage media of claim 8, wherein the return path specified by the second network element comprises a segment list included in a segment routing header of the S-BFD control packet.

11. The one or more non-transitory computer readable storage media of claim 8, further comprising instructions that cause the processor to:

receive, at the first network element, a plurality of S-BFD control packets sent from the second network element;

wherein a first S-BFD control packet includes the second discriminator identifier and a first segment list in a segment routing header of the first S-BFD control packet, the first segment list specifying a first return path for a response S-BFD control packet transmitted from the first network element to the second network element; and wherein a second S-BFD control packet includes the second discriminator identifier and a second segment list in a segment routing header of the second S-BFD control packet, the second segment list specifying a second return path for a response S-BFD control packet transmitted from the first network element to the second network element, wherein the second return path is different than the first return path.

12. The one or more non-transitory computer readable storage media of claim 8, wherein the first network element and the second network element are disposed in a network comprising a plurality of network elements; and further comprising instructions that, when executed by a processor of the second network element, cause the processor to:

receive, at the second network element, network topology information from one or more of the plurality of network elements; and include one of the first discriminator identifier or the second discriminator identifier in the S-BFD control packet based on the received network topology information.

13. The one or more non-transitory computer readable storage media of claim 12, further comprising instructions that cause the processor of the second network element to:

determine information for specifying the return path included in the S-BFD control packet based on the received network topology information.

14. The one or more non-transitory computer readable storage media of claim 8, wherein the S-BFD control packet is one of:

an internet protocol version 4 (IPv4) packet;
an internet protocol version 6 (IPv6) packet; and
a Multiprotocol Label Switching (MPLS) packet.

15. An apparatus comprising:

a plurality of network ports configured to receive inbound packets and to send outbound packets;

a memory;

a processor coupled to the memory and to the plurality of network ports, wherein the processor is configured to:

assign a first discriminator associated with a first discriminator identifier;

assign a second discriminator associated with a second discriminator identifier, wherein the second discriminator is different from the first discriminator;

receive a seamless bidirectional forwarding detection (S-BFD) control packet sent from a network element, the S-BFD control packet including one of the first discriminator identifier or the second discriminator identifier;

determine whether the first discriminator identifier or the second discriminator identifier is included in the S-BFD control packet;

initiate an S-BFD reflector session to transmit a response S-BFD control packet to the network element along a return path determined based on whether the first discriminator identifier or the second discriminator identifier is included in the S-BFD control packet;

when the first discriminator identifier is included in the S-BFD control packet, determine the return path for the response S-BFD control packet by the apparatus; and when the second discriminator identifier is included in the S-BFD control packet, determine the return path for the response S-BFD control packet specified by the network element in the S-BFD control packet.

16. The apparatus of claim 15, wherein the return path determined by the apparatus is a shortest path to the network element.

17. The apparatus of claim 15, wherein the return path specified by the network element comprises a segment list included in a segment routing header of the S-BFD control packet.

18. The apparatus of claim 15, wherein the processor is further configured to:

receive a plurality of S-BFD control packets sent from the network element;

wherein a first S-BFD control packet includes the second discriminator identifier and a first segment list in a segment routing header of the first S-BFD control packet, the first segment list specifying a first return path for a response S-BFD control packet transmitted from the apparatus to the network element; and wherein a second S-BFD control packet includes the second discriminator identifier and a second segment list in a segment routing header of the second S-BFD control packet, the second segment list specifying a second return path for a response S-BFD control packet transmitted from the apparatus to the network element, wherein the second return path is different than the first return path.

19. The apparatus of claim 18, wherein the first segment list comprises a first ordered set of a plurality of segment identifiers for one or more network elements of a plurality of network elements;
   wherein the second segment list comprises a second ordered set of a plurality of segment identifiers for one or more network elements of the plurality of network elements; and
   wherein at least one segment identifier in the first ordered set is different from the plurality of segment identifiers in the second ordered set.

20. The apparatus of claim 15, wherein the S-BFD control packet is one of:
   an internet protocol version 4 (IPv4) packet;
   an internet protocol version 6 (IPv6) packet; and
   a Multiprotocol Label Switching (MPLS) packet.

* * * * *